(12) United States Patent
Malik et al.

(10) Patent No.: US 6,487,095 B1
(45) Date of Patent: Nov. 26, 2002

(54) MULTIPHASE ZERO-VOLT-SWITCHING RESONANT DC-DC REGULATOR

(75) Inventors: Randhir Singh Malik, Cary, NC (US);
William Hemena, Raleigh, NC (US);
Thai Q. Ngo, Rochester, MN (US);
Scott D. Strand, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/002,754

(22) Filed: Oct. 31, 2001

(51) Int. Cl.[7] .............................................. H02M 3/335
(52) U.S. Cl. ........................................ 363/25; 363/127
(58) Field of Search ............................. 363/24, 25, 65, 363/82, 84, 89, 90, 127, 133

(56) References Cited

U.S. PATENT DOCUMENTS

| | | | |
|---|---|---|---|
| 5,177,675 A | * 1/1993 | Archer | 363/134 |
| 5,177,676 A | 1/1993 | Inam et al. | 363/80 |
| 5,303,137 A | 4/1994 | Peterson | 363/16 |
| 5,459,650 A | 10/1995 | Noro | 363/24 |
| 5,729,444 A | 3/1998 | Perol | 363/25 |
| 5,754,413 A | 5/1998 | Fraidlin et al. | 363/16 |
| 5,946,206 A | 8/1999 | Shimizu et al. | 363/65 |
| 5,959,438 A | 9/1999 | Jovanovic et al. | 323/222 |
| 6,055,162 A | 4/2000 | Tarrillo et al. | 363/25 |
| 6,137,698 A | 10/2000 | Yukawa et al. | 363/25 |
| 6,262,905 B1 | * 7/2001 | Zhang et al. | 323/225 |
| 6,301,128 B1 | * 10/2001 | Jang et al. | 363/17 |
| 6,353,544 B1 | * 3/2002 | Lau | 363/21.12 |

* cited by examiner

Primary Examiner—Jeffrey Sterrett
Assistant Examiner—Gary L. Laxton
(74) Attorney, Agent, or Firm—Sawyer Law Group

(57) ABSTRACT

A multiphase zero-volt switching, zero volt switch resonant DC-DC regulator includes: a zero-volt switch zero volt switch; a DC output voltage means; a variable resonant circuit; a synchronous rectifier; and a sensing circuit. The sensing circuit senses a DC output voltage at the DC output of the regulator. The regulator uses the resonant circuit in conjunction with the sensing circuit to provide a substantially constant DC output voltage at a fixed frequency. If the sensing circuit senses a change in the DC output voltage, then a resonant frequency of the regulator is changed by the variable resonant circuit. This allows the oscillator of the regulator to maintain a fixed frequency, thus ensuring the availability of zero-volt switching over the full range of operation. The regulator also has the advantages of low power loss, reduced ripple, and a very fast transient response time.

23 Claims, 2 Drawing Sheets

MULTIPHASE ZERO-VOLT-SWITCHING RESONANT DC-DC REGULATOR

FIELD OF THE INVENTION

The present invention relates to power sources, and more particularly to DC-DC regulators.

BACKGROUND OF THE INVENTION

DC-DC regulators are well known in the art. FIG. 1. illustrates a conventional DC-DC regulator. The conventional DC-DC regulator 100 is a variable frequency resonant DC-DC regulator. The regulator 100 comprises a pull-pull driver 102 with a Voltage Controlled Oscillator (VCO) 124, a zero-current switch 104 (ZCS) with switching transistors 126 and 128, a resonant circuit 130 with transformer 106 (TI) and a capacitor 108 (C2), a synchronous rectifier 132, a sensing circuit 134 with resistors 112 and 114 and an error amplifier 116, and an opto-coupler 118 with a diode 120 and a transistor 122.

The DC output voltage is sensed by R1 112 and R2 114 and fed to the error amplifier 116. The error amplifier 116 compared the DC output voltage against VREF. The output of the error amplifier 116 drives a current proportional to the error voltage through the opto-coupler diode 120 of the opto-coupler 118, which then develops a voltage across the transistor 122 of the opto-coupler 118. This variable voltage so developed is applied to the VCO 124 which changes the frequency of the push-pull driver 102.

To maintain a constant DC output voltage, the conventional DC-DC regulator 100 changes the frequency of the push-pull driver 102 to maintain zero current switching (ZCS) operation. However, this prevents the push-pull transistors of the ZCS from operating in ZCS mode over the full range of operations. This may result in the loss of zero-current switching, high dissipation in the regulator, and unpredictable behavior due the wide range of frequencies.

Accordingly, there exists a need for an improved DC-DC regulator. The improved DC-DC regulator should maintain a substantially constant DC output voltage without changing the frequency of the oscillator. The present invention addresses such a need.

SUMMARY OF THE INVENTION

A multiphase zero-volt switching (ZVS) resonant DC-DC regulator includes: a zero-volt switch (ZVS); a DC output voltage means; a variable resonant circuit; a synchronous rectifier; and a sensing circuit. The sensing circuit senses a DC output voltage at the DC output of the regulator. The regulator uses the resonant circuit in conjunction with the sensing circuit to provide a substantially constant DC output voltage at a fixed frequency. If the sensing circuit senses a change in the DC output voltage, then a resonant frequency of the regulator is changed by the variable resonant circuit. This allows the oscillator of the regulator to maintain a fixed frequency, thus ensuring the availability of zero-volt switching over the full range of operation. The regulator also has the advantages of low power loss, reduced ripple, and a very fast transient response time.

DETAILED DESCRIPTION

The present invention provides an improved DC-DC regulator. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention provides a multiphase zero-volt switching (ZVS) resonant DC-DC, regulator. The regulator in accordance with the present invention uses a resonant circuit in conjunction with an error amplifier to provide a substantially constant DC output voltage at a fixed frequency. This allows the oscillator to maintain a fixed frequency, thus ensuring the availability of zero-volt switching over the full range of operation.

To more particularly describe the features of the present invention, please refer to FIG. 2 in conjunction with the discussion below.

Figure 1:
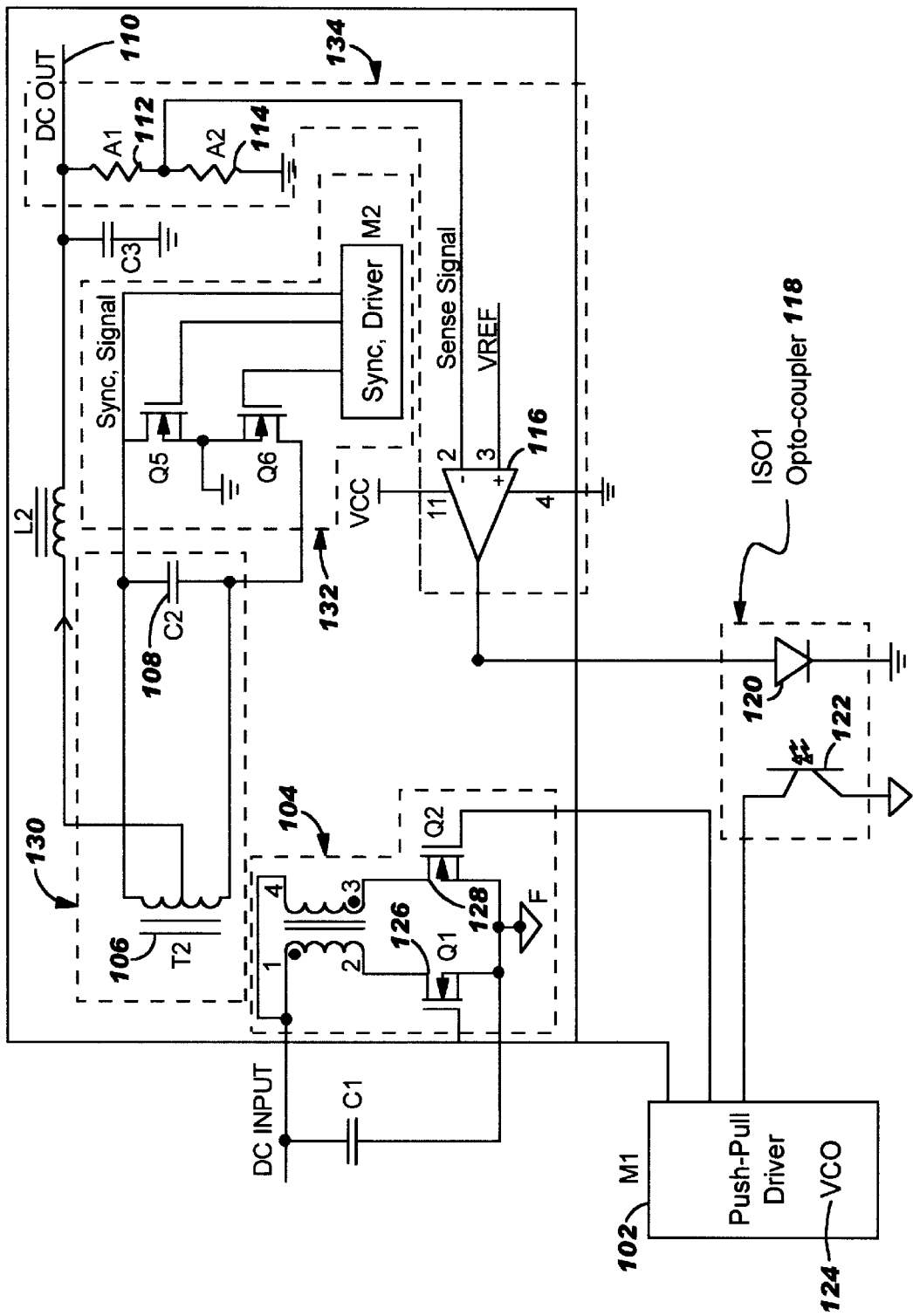
FIG. 1 illustrates a conventional DC-DC regulator.
Figure 2:
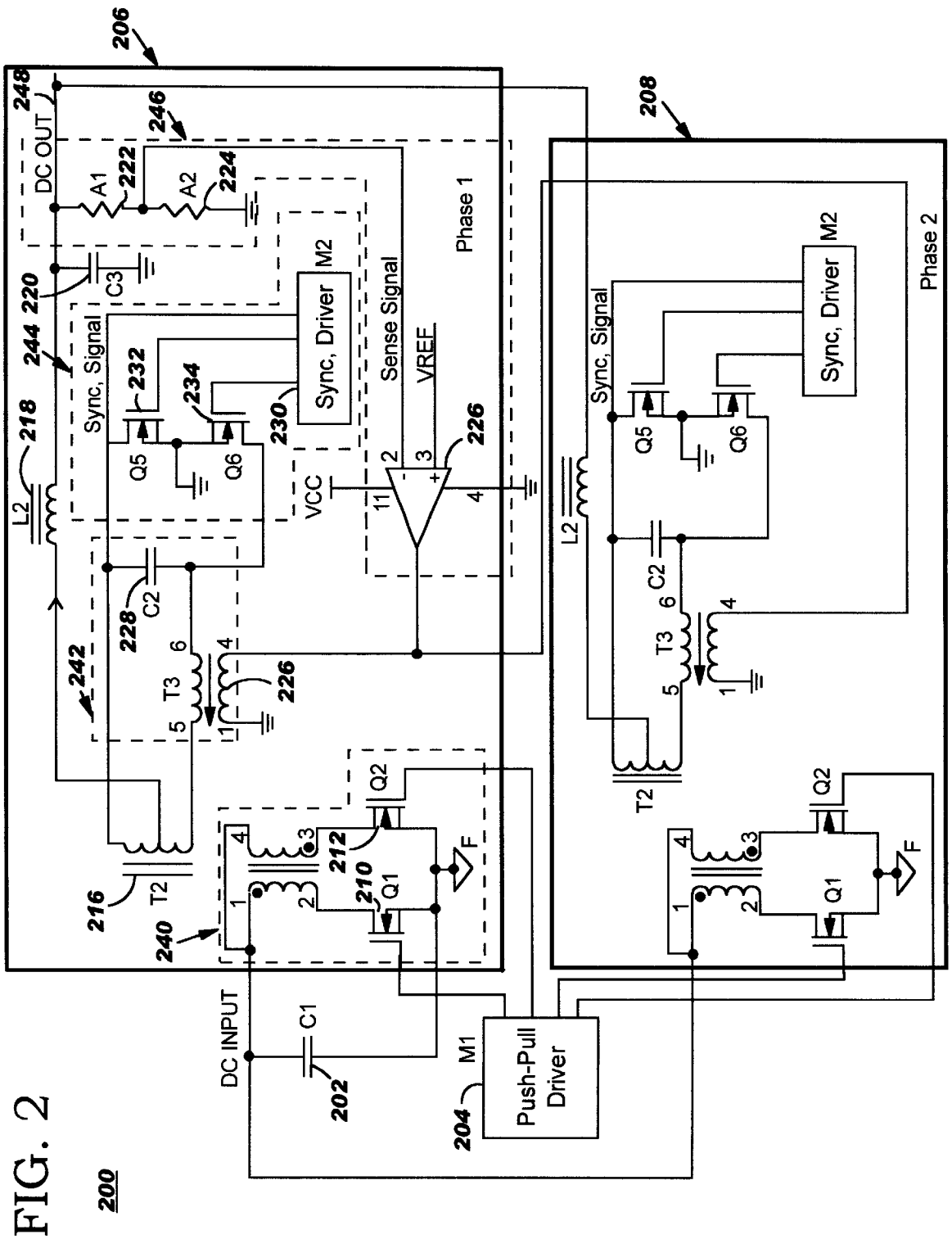
FIG. 2 illustrates a preferred embodiment of a multiphase ZVS resonant DC-DC regulator in accordance with the present invention.

FIG. 2 illustrates a preferred embodiment of a multiphase ZVS resonant DC-DC regulator in accordance with the present invention. The regulator circuit 200 comprises an input high frequency capacitor (C1) 202 coupled to the DC input, an oscillator 204, a phase I circuit 206, and a phase II circuit 208. In the preferred embodiment, the oscillator 204 is a push-pull driver which alternates the operation of the circuit 200 between the phase I circuit 206 and the phase II circuit 208 such that the circuits 206 and 208 operate at approximately 180 degrees out of phase. The operation of the phase I circuit 206 will be described below. The operation of the phase II circuit 208 is substantially similar to the phase I circuit 206 except it operations out of phase with the phase I circuit 206.

The phase I circuit 206 comprises a push-pull zero volt switch (ZVS) 240, which comprises push-pull transistors Q1 210 and Q2 212 and a transformer 216, coupled as illustrated. In the preferred embodiment, each transistor Q1 210 and Q2 212 is a metal oxide semiconductor field effect transistor (MOSFET) which turns on at approximately 0V (zero volts). Because the polarity of the drive signals for Q1 210 and Q2 212 are opposites, they alternate being in the "on" state. The combination of Q1 210, Q2 212, and the transformer 216 provides an open loop, push-pull ZVS at a fixed frequency. The pull-push driver 204 allows the phase I circuit 206 and the phase II circuit 208 to operate in approximately 180 degrees out of phase.

Coupled to the ZVS 240 is a high frequency transformer (T2) 216, an output inductor (L2) 218, and an output capacitor (C3) 220 which provide the DC output voltage. The circuit 200 further comprises a variable resonant circuit 242, comprising a resonant inductor (T3) 226 and a resonant capacitor (C2) 228, coupled as illustrated.

Coupled to the variable resonant circuit 242 is a synchronous rectifier 244 which comprises a synchronization driver 230 and synchronization transistors Q5 232 and Q6 234. In the preferred embodiment, Q5 232 and Q6 234 are MOSFET's. The gates of Q5 232 and Q6 234 are coupled to the synchronization driver 230 while the drains of Q5 232 and Q6 234 are coupled to the variable resonant circuit 242. The sources of Q5 232 and Q6 234 are grounded. The synchronous rectifier 244 rectifies a sinusoidal voltage across T2 216. L2 218 C3220 then filters the rectified voltage, and creates the DC output voltage.

The circuit 200 further comprises a sensing circuit 246 which comprises sense resistors (R1) 222 and (R2) 224 coupled to the DC output 248, and an error amplifier 226. R1 222 and R2 224 senses the DC output voltage and carries it to the error amplifier 226 as a sense signal. The error amplifier 226 compares the sense signal with a reference voltage (VREF). The output of the error amplifier 226 is coupled to T3 226, such that the current provided to T3 226 is determined by the voltage output by the error amplifier 226. If the sense signal increases, i.e., the DC output voltage increases, then the voltage output from the error amplifier 226 decreases. This decreases the current in T3 226. Decreasing the current in T3 226 increases its inductance. The increasing of the inductance of T3 226 lowers the natural resonant frequency of the circuit 200 as provided by T2 216, L2 218 and C3 220. Lowering the natural resonant frequency of the circuit 200 results in a lower DC output voltage.

The converse is also true. If the sense signal decreases, i.e., the DC output voltage decreases, then the voltage output from the error amplifier 226 increases. This increases the current to T3 226. Increasing the current in T3 226 decreases its inductance. The decreasing of the inductance in T3 226 increases the natural resonant frequency of the circuit 200 as provided by T2 216, L2 218 and C3 220. Increasing the natural resonant frequency of the circuit 200 results in a higher DC output voltage.

In this manner, the circuit 200 regulates the DC output voltage so that it is substantially constant, even if the load at the DC output 248 changes. Because the regulation is accomplished through the variable resonant circuit 242, the oscillator 204 can operate in a fixed frequency. This allows the ZVS 240 to maintain a well controlled stable operation with low power loss. Because a multiphase operation is possible by the push-pull driver 204, the circuit 200 has reduced ripple at the DC output 248. Because of the multiphase operation, the frequency of the output ripple is multiplied by the number of phases, i.e., reduced, and therefore, ceramic capacitors may be used for C1 202 and C3 220, reducing the cost of the circuit 200. The multiphase operation of the circuit 200 also allows the use of a smaller inductor L2 218, thus allowing for a very fast transient response time, thus reducing the cost of the circuit 200.

The operation of the phase II circuit 208 is similar to the phase I circuit 206 except it functions 180 degrees out of phase from the phase I circuit 206. For the sake of brevity, the operation of the phase II circuit 208 will not be further described.

Although the present invention is described with a two phase circuit, one of ordinary skill in the art will understand that more than two phases may be used without departing from the spirit and scope of the present invention. The higher the number of phases, the smaller will be the sizes of the components, and the faster will be the transient response time.

A multiphase zero-volt switching (ZVS) resonant DC-DC regulator has been disclosed. The regulator uses a resonant circuit in conjunction with an error amplifier to provide a substantially constant DC output voltage at a fixed frequency. This allows the oscillator to maintain a fixed frequency, thus ensuring the availability of zero-volt switching over the full range of operation. The regulator also has the advantages of low power loss, reduced ripple, and a fast response time.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A multiphase direct current DC-DC regulator, the regulator including a DC output, the regulator comprising:
   a zero volt switch
   a DC output voltage means coupled to the zero volt switch and the DC output;
   a variable resonant circuit coupled to the DC output voltage means;
   a synchronous rectifier coupled to the DC output voltage means and the variable resonant circuit; and
   a sensing circuit coupled to the DC output and the variable resonant circuit, wherein the sensing circuit senses changes in a DC output voltage at the DC output,
   wherein if the sensing circuit senses an increase in the DC output voltage, then a resonant frequency of the regulator is decreased by the variable resonant circuit,
   wherein if the sensing circuit senses a decrease in the DC output voltage, then a resonant frequency of the regulator is increased by the variable resonant circuit.

2. The regulator of claim 1, wherein the zero volt switch comprises:
   a set of push-pull transistors coupled to a DC input; and
   a transformer coupled to the set of push-pull transistors and the DC input.

3. The regulator of claim 1, wherein the DC output voltage means comprises:
   a high frequency transformer coupled to the variable resonant circuit;
   an output inductor coupled to the high frequency transformer; and
   an output capacitor coupled to the output inductor and the DC output.

4. The regulator of claim 1, wherein the variable resonant circuit comprises:
   a resonant inductor coupled to a high frequency transformer of the DC output voltage means; and
   a resonant capacitor coupled to the resonant inductor and the high frequency transformer.

5. The regulator of claim 1, wherein the synchronous rectifier comprises:
   a synchronization driver; and
   a set of synchronization transistors, wherein gates of the synchronization transistors are coupled to the synchronization driver, wherein drains of the synchronization transistors are coupled to the variable resonant circuit, wherein sources of the synchronization transistors are grounded.

6. The regulator of claim 1, wherein the sensing circuit comprises:
   an error amplifier, wherein an output of the error amplifier is coupled to a resonant inductor of the variable resonant circuit; and
   at least one sensing resistor coupled to the DC output and the error amplifier, wherein the at least one sensing resistor provides the error amplifier with a sense signal concerning the DC output voltage.

7. The regulator of claim 6, wherein the error amplifier compares the sense signal with a reference voltage, wherein if the sense signal increases as compared with the reference voltage, then an output voltage of the error amplifier increases, wherein if the sense signal decreases as compared with the reference voltage, than an output voltage of the error amplifier decreases.

8. A multiphase DC-DC regulator, the regulator including a DC output, the regulator comprising:

zero volt switch a DC output voltage means coupled to the zero volt switch and the DC output;

a variable resonant circuit coupled to the DC output voltage means, the variable resonant circuit comprising:
  a resonant inductor coupled to the DC output voltage means, and
  a resonant capacitor coupled to the resonant inductor and the DC output voltage means;

a synchronous rectifier coupled to the DC output voltage means and the variable resonant circuit; and a sensing circuit coupled to the DC output and the resonant inductor of the variable resonant circuit, wherein the sensing circuit senses changes in a DC output voltage at the DC output, wherein if the sensing circuit senses an increase in the DC output voltage, then a resonant frequency of the DC output voltage means is decreased by the variable resonant circuit, wherein if the sensing circuit senses a decrease in the DC output voltage, then a resonant frequency of the DC output voltage means is increased by the variable resonant circuit.

9. The regulator of claim 8, wherein the zero volt switch comprises:
  a set of push-pull transistors coupled to a DC input; and
  a transformer coupled to the set of push-pull transistors and the DC input.

10. The regulator of claim 8 wherein the DC output voltage means comprises:
  a high frequency transformer coupled to the resonant inductor and the resonant capacitor of the variable resonant circuit;
  an output inductor coupled to the high frequency transformer; and
  an output capacitor coupled to the output inductor and the DC output.

11. The regulator of claim 8, wherein the synchronous rectifier comprises:
  a synchronization driver; and
  a set of synchronization transistors, wherein gates of the synchronization transistors are coupled to the synchronization driver, wherein drains of the synchronization transistors are coupled to the variable resonant circuit, wherein sources of the synchronization transistors are grounded.

12. The regulator of claim 8, wherein the sensing circuit comprises:
  an error amplifier, wherein an output of the error amplifier is coupled to the resonant inductor of the variable resonant circuit; and
  at least one sensing resistor coupled to the DC output and the error amplifier, wherein the at least one sensing resistor provides the error amplifier with a sense signal concerning the DC output voltage.

13. The regulator of claim 12, wherein the error amplifier compares the sense signal with a reference voltage,
  wherein if the sense signal increases as compared with the reference voltage, then an output voltage of the error amplifier increases,
  wherein if the sense signal decreases as compared with the reference voltage, than an output voltage of the error amplifier decreases.

14. A multiphase DC-DC regulator, the regulator including a DC output, the regulator comprising:
  an oscillator;
  a phase one circuit coupled to the oscillator, the phase one circuit comprising:
    a first zero volt switch
    a first DC output voltage means coupled to the first zero volt switch and the DC output,
    a first variable resonant circuit coupled to the first DC output voltage means, and
    a first synchronous rectifier coupled to the first DC output voltage means and the first variable resonant circuit;
  a phase two circuit coupled to the oscillator, the phase two circuit comprising:
    a second zero volt switch
    a second DC output voltage means coupled to the second zero volt switch and the DC output,
    a second variable resonant circuit coupled to the second DC output voltage means, and
    a second synchronous rectifier coupled to the second DC output voltage means and the second variable resonant circuit,
    wherein an operation of the phase two circuit is out of phase with an operation of the phase one circuit; and
  a sensing circuit coupled to the DC output, the first variable resonant circuit, and the second variable resonant circuit, wherein the sensing circuit senses changes in a DC output voltage at the DC output,
  wherein if the sensing circuit senses an increase in the DC output voltage, then a resonant frequency of the regulator is decreased by the first and second variable resonant circuits,
  wherein if the sensing circuit senses a decrease in the DC output voltage, then a resonant frequency of the regulator is increased by the first and second variable resonant circuits.

15. The regulator of claim 14, wherein the first zero volt switch comprises:
  a first set of push-pull transistors coupled to a DC input; and
  a first transformer coupled to the first set of push-pull transistors and the DC input.

16. The regulator of claim 14, wherein the second zero volt switch comprises:
  a second set of push-pull transistors coupled to a DC input; and
  a second transformer coupled to the second set of push-pull transistors and the DC input.

17. The regulator of claim 14, wherein the first DC output voltage means comprises:
  a first high frequency transformer coupled to the first variable resonant circuit;
  a first output inductor coupled to the first high frequency transformer; and
  a first output capacitor coupled to the first output inductor and the DC output.

18. The regulator of claim 14, wherein the second DC output voltage means comprises:
- a second high frequency transformer coupled to the second variable resonant circuit;
- a second output inductor coupled to the second high frequency transformer; and
- a second output capacitor coupled to the second output inductor and the DC output.

19. The regulator of claim 14, wherein the first variable resonant circuit comprises:
- a first resonant inductor coupled to a first high frequency transformer of the first DC output voltage means; and
- a first resonant capacitor coupled to the first resonant inductor and the first high frequency transformer.

20. The regulator of claim 14, wherein the first synchronous rectifier comprises:
- a first synchronization driver; and
- a first set of synchronization transistors, wherein gates of the first synchronization transistors are coupled to the first synchronization driver, wherein drains of the first synchronization transistors are coupled to the first variable resonant circuit, wherein sources of the first synchronization transistors are grounded.

21. The regulator of claim 14, wherein the second synchronous rectifier comprises:
- a second synchronization driver; and
- a second set of synchronization transistors, wherein gates of the second synchronization transistors are coupled to the second synchronization driver, wherein drains of the second synchronization transistors are coupled to the second variable resonant circuit, wherein sources of the second synchronization transistors are grounded.

22. The regulator of claim 14, wherein the sensing circuit comprises:
- an error amplifier, wherein an output of the error amplifier is coupled to a first resonant inductor of the first variable resonant circuit and to a second resonant inductor of the second variable resonant circuit; and
- at least one sensing resistor coupled to the DC output and the error amplifier, wherein the at least one sensing resistor provides the error amplifier with a sense signal concerning the DC output voltage.

23. The regulator of claim 22, wherein the error amplifier compares the sense signal with a reference voltage,
wherein if the sense signal increases as compared with the reference voltage, then an output voltage of the error amplifier increases,
wherein if the sense signal decreases as compared with the reference voltage, than an output voltage of the error amplifier decreases.

* * * * *